Oct. 1, 1929.  K. WITZEL  1,729,810
ELECTRIC HEATING ARRANGEMENT FOR HEATING
THE COOLING WATER OF COMBUSTION ENGINES
Filed Nov. 10, 1928

Inventor:
Karl Witzel

Patented Oct. 1, 1929

1,729,810

UNITED STATES PATENT OFFICE

KARL WITZEL, OF ZUFFENHAUSEN, GERMANY

ELECTRIC HEATING ARRANGEMENT FOR HEATING THE COOLING WATER OF COMBUSTION ENGINES

Application filed November 10, 1928, Serial No. 318,376, and in Germany June 13, 1928.

The object of the present invention is electric heating arrangement serving to heat the cooling water piping of combustion engines (motors) as well as to heat at the same time the air surrounding the same. The present invention especially has in view the utilization of the heating effect of devices destined for this purpose so that simultaneously with the heating of the cooling water also the air surrounding the motor is heated to a much higher degree than hitherto. This higher heating effect has been obtained by providing for a large special heating surface as well as, in connection therewith, for a copious radiation and distribution of heat. This is preferably placed in execution by sliding over the heating device as a heating surface a jacket made of heat conducting material. The said jacket at the same time provides the advantage that the heating tapes are covered, that is to say protected; by the jacket and the two side plates of the device, between which are the heating tapes, an enclosed space is formed serving as a heat accumulator because of the highly heated air contained therein and facilitating at the same time the thorough heating of the whole jacket.

Figure 1:
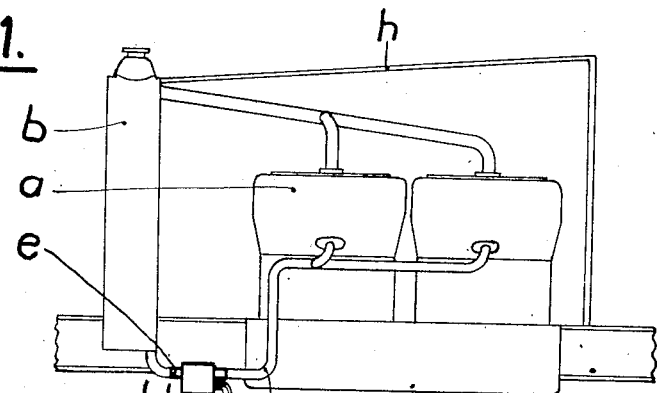
Figure 2:
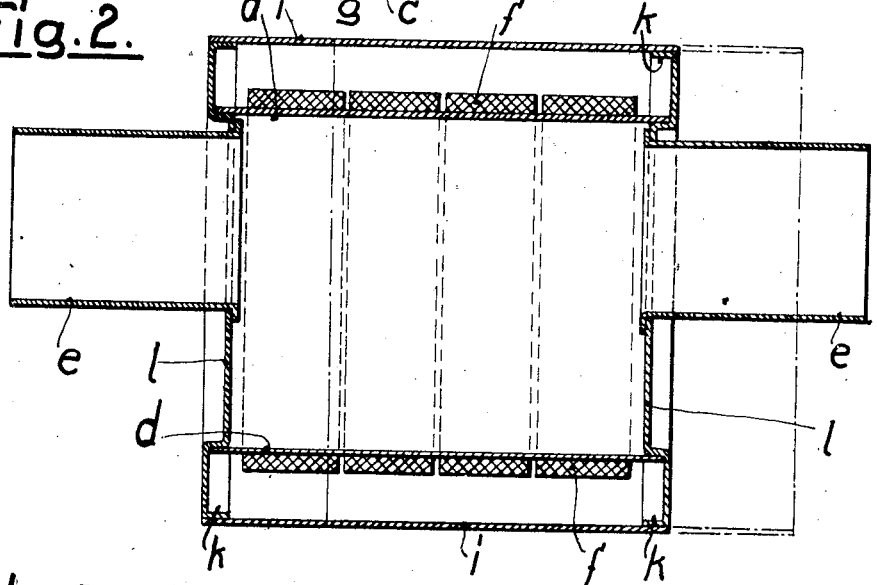
Figure 3:
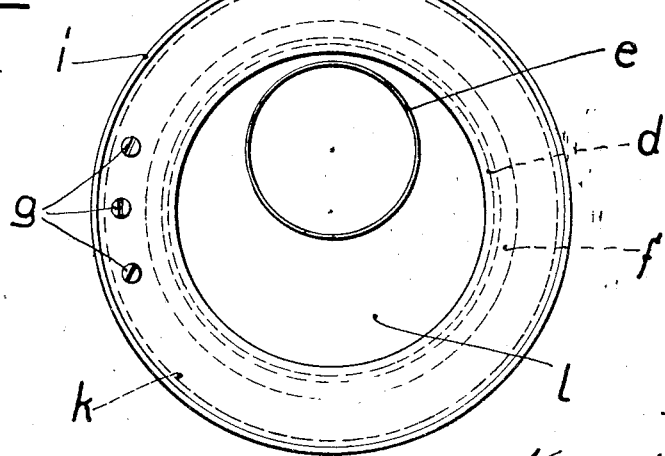

The present invention is illustrated on the drawing in one constructive form in which, Fig. 1 is a diagrammatic side view of the internal combustion engine and its cooling system and showing the heating arrangement, Fig. 2 is an axial section of the heating device, and Fig. 3 is a front view thereof.

The heating device is placed between the motor $a$ and the radiator $b$, in the piping $c$. It consists of a relatively large hollow cylindrical body $d$ made of heat conducting material and it is provided on both sides with connecting pipes $e$ in order to be inserted into the cooling water circulation pipe $c$. Around the body $d$ there are heating tapes or coils $f$ provided with a connection-contact $g$ for the electric current.

According to the present invention the heating device on the outside is provided with a special heating surface which is heated by the heating tapes $f$ and heats the surrounding air, to thereby heat the air below the bonnet or hood $h$ which is sucked into the carburetor by the motor.

The said heating surface in the example consists of a cylinder $i$ made of sheet metal or other suitable heat conducting material. The jacket $i$ is loosely slid over the device so that it can be removed and is engaged and secured against flanges "$k$" of the side plates $l$ between which are the heating tapes $f$. By removing aside the jacket $i$ axially, as shown in Fig. 2, an easy access to the heating tapes is obtained. The jacket $i$ between the side plates $l$ forms a heating space, the air of which is intensively heated by the tapes $f$. This air on its part subsequently warms the heating surface $i$ and radiating the heat. The aforesaid surface moreover is heated by the overflowing heat of the heated side plates $l$.

The form of the jacket $i$ itself can be suitably changed as desired.

I claim:

1. An electric heating device for the water cooling system of an internal combustion engine comprising a body adapted to be inserted into the water system to heat the water therein; heating coils surrounding said body; and a jacket surrounding said coils adapted to conduct a portion of the heat from the coils to the surrounding air for the engine.

2. An electric heating device for the water cooling system of an internal combustion engine comprising a body adapted to be inserted into the water system to heat the water therein; heating coils surrounding said body; and a jacket surrounding said coils adapted to conduct a portion of the heat from the coils to the surrounding air for the engine, said jacket being slidably mounted on the body so as to render the coils accessible.

3. An electric heating device for the water cooling system of an internal combustion engine comprising an enlarged cylindrical body adapted to be inserted into the water system to heat the water therein; a pair of side plates for the body; heating coils surrounding said body; and a jacket slidably mounted on the side plates and surrounding said coils adapted to heat the surrounding air for the engine.

In testimony whereof I affix my signature.

KARL WITZEL.